United States Patent [19]
Dupre

[11] Patent Number: 6,019,895
[45] Date of Patent: Feb. 1, 2000

[54] APPARATUS AND METHOD FOR TREATING WASTE WATER

[76] Inventor: Herman K. Dupre, c/o Seven Springs, Champion, Pa. 15622

[21] Appl. No.: 09/058,871

[22] Filed: Apr. 13, 1998

[51] Int. Cl.⁷ .................................................... C02F 1/72
[52] U.S. Cl. ...................... 210/198.1; 210/170; 210/205; 261/76; 261/124
[58] Field of Search ............................. 210/198.1, 205, 210/170; 261/76, 124

[56] References Cited

U.S. PATENT DOCUMENTS

| | | | |
|---|---|---|---|
| 2,682,827 | 7/1954 | Gressly | 99/251 |
| 2,820,620 | 1/1958 | Anderson | 261/124 |
| 2,822,157 | 2/1958 | Porter | 261/124 |
| 2,951,061 | 8/1960 | Gomory | 260/83.7 |
| 3,276,994 | 10/1966 | Andrews | 261/124 |
| 3,704,008 | 11/1972 | Ziegler | 261/25 |
| 3,959,142 | 5/1976 | Dupre | 210/170 |
| 4,019,720 | 4/1977 | Levesque et al. | 259/4 R |
| 4,165,286 | 8/1979 | Schreiber et al. | 210/220 |

*Primary Examiner*—David A. Simmons
*Assistant Examiner*—Betsey J. Morrison
*Attorney, Agent, or Firm*—Carothers & Carothers

[57] ABSTRACT

A waste water treating system which has an incline pipe for passing waste water therethrough by gravity flow. This aeration pipe has tuyere perforations penetrating the pipe along a portion and a sealed jacket surrounds this perforated portion of the pipe. An access conduit is connected to the jacket for access to the interior of the jacket and an air fan is mounted at the upper in the access conduit for forcing air under pressure from its inlet into the interior of the jacket and through the perforation as tuyeres for agitating and aerating waste water passing through the perforated aeration pipe. Additional aeration may be accomplished by gravity flow of the waste water by connecting the downstream end of this perforated pipe to a vertical riser pipe for flowing waste water by gravity flow from an upper open end of the riser pipe to assist in further aeration of the waste water.

10 Claims, 1 Drawing Sheet

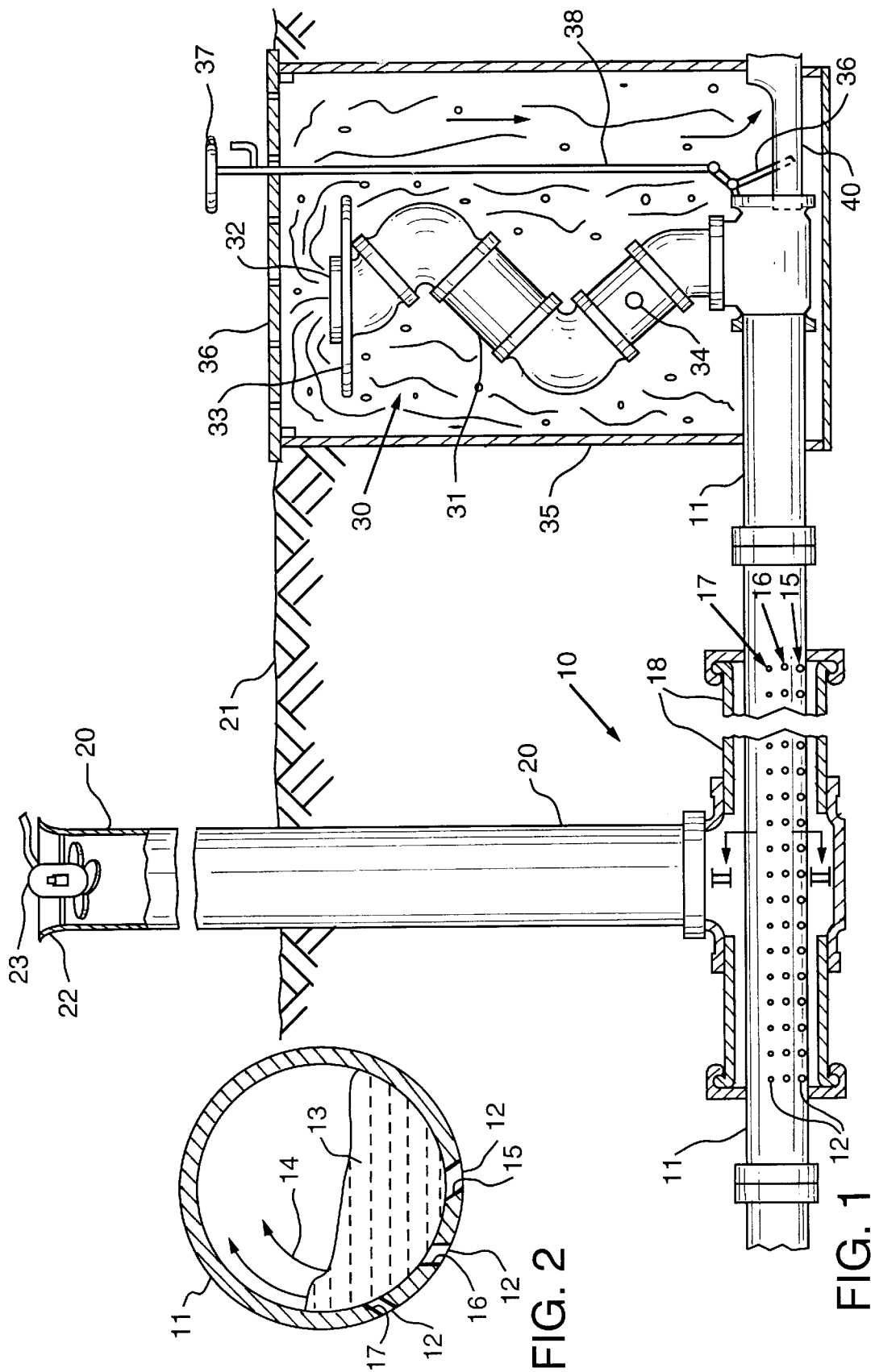

APPARATUS AND METHOD FOR TREATING WASTE WATER

BACKGROUND OF THE INVENTION

The present invention pertains to the treatment of waste water and more particularly an inexpensive apparatus and process for aerating raw mine acid drainage and sewage prior to final treatment.

Present day mine acid and sewage treatment facilities require expensive equipment for pretreating waste liquid in order to reestablish the oxygen level therein. This is generally accomplished by spraying the liquid through the air with continuously operating pumps over a large area, requiring considerable land space and the expensive and continuous operation of electrical pumps with minimal results.

In addition, such methods of aeration are not sufficiently efficient and require subsequent expensive chemical treatment and/or ozone treatment.

It is a principal object of the present invention to provide aeration pretreatment of such liquid mine acid drainage or sewage which eliminates the aforementioned disadvantages and employs inexpensive, simple yet effective aeration techniques utilizing the gravity flow of the waste liquid being treated and an aerator which is both inexpensive to construct and operate.

SUMMARY OF THE INVENTION

The apparatus of the present invention for treating waste water, such as mine acid drainage or raw sewage, is comprised of an inclined pipe for passing waste water therethrough by gravity flow. This aeration pipe is provided with tuyere perforations penetrating the pipe along a portion thereof.

A sealed jacket surrounds this perforated portion of the pipe and an access conduit is connected to the jacket for access to its interior. This access conduit has an open inlet that is positioned above the jacket. A relatively inexpensive air fan is connected to the access conduit for forcing air under pressure from the inlet through these perforations as tuyeres for aerating waste water passing through the pipe.

These tuyere perforations are provided in the bottom half or in a bottom quarter segment of the pipe so that the air under pressure is forced upwardly in the passing waste liquid and the waste liquid is thoroughly agitated and foamed by the compressed air injected into the flowing waste water thereby providing maximum agitation of the waste water while aerating the same.

In fact, in order to increase this foaming agitation of the flowing waste water within the pipe, the tuyere perforations may all be sloped in the same direction so that they enter the bottom half or bottom quadrant of the pipe all in the same direction thereby inducing circular agitation of the flowing waste water with the injected streams of air under pressure to thereby provide maximum agitation and foaming. To further enhance this agitation capability, the tuyere perforations are preferably provided in horizontal rows, one row above the other, from the bottom of the pipe upwardly with successively decreasing hole diameter.

In other words, the tuyere perforations at the bottom of the aeration pipe are of larger diameter than those further up the pipe wall so that maximum penetration and agitation of the waste water flowing in the pipe is effected.

The air fan needs to have sufficient capacity for providing an air flow of at least 3,000 cfm and a pressure of at least 12 inches standard pressure. For example, a relatively inexpensive electric fan of 10 horsepower is sufficiently adequate and provides approximately 3,300 cfm of air at an internal pressure of approximately 12 inches.

Accordingly, the apparatus and method of treating waste water in accordance with the teachings of the present invention is carried out simply with the gravity flow of the waste water and the use of an inexpensive motorized fan as an air compressor thereby eliminating the requirement of expensive air compressors, pumps or ozone generating and injecting equipment.

An additional gravity flow aerator may be connected to the downstream end of this aeration pipe and is comprised of a vertical riser pipe of predetermined vertical height for flowing waste water upwardly by gravity flow from its upper open end in a fountain head. A horizontal splash baffle is preferably provided adjacent the outside of this upper end of the riser pipe to assist in aerating the liquid as it splashes on the baffle from the fountain head.

The riser pipe may also be provided with a serpentine configuration to provide a circulative flow path for the waste water passing upwardly therethrough to cause further agitation and mixing of oxygen from the air with the waste liquid.

A vent hole is also provided in this riser pipe intermediate its upper and lower ends so that in the event the waste water being treated is not sufficiently foamed and thereby creates a solid column of water within the riser pipe, this non-agitated dense waste water may flow out of the vent hole thereby permitting the use of a minimum horse power motorized fan to operate the system until such time that the waste water again becomes fully aerated and foamed in the aeration pipe and can readily be thereafter forced by the efforts of the low horsepower electric fan and gravity flow all the way up to the top of the riser pipe again.

In addition, the access conduit for the jacket that surrounds the perforated portion of the aeration pipe is provided with an access conduit that is positioned above the fountain head created by the riser pipe of the downstream aerator. Accordingly, should the system temporarily become inoperative, the water level of the entire system will never be sufficiently high enough within the access conduit to submerge the electric fan.

The riser pipe aerator is enclosed within a housing that has a bottom outlet drain. A manually or independently operated flush valve is provided at the lower end of the riser pipe for selectively flushing accumulated solid waste matter in the lower end portion of the riser pipe out into the housing so that the system may be periodically cleaned of solid waste matter such as rocks and stones.

After this aeration treatment, the waste water may be further treated as by pooling it in a lagoon or settlement pond for solid particle waste settlement.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the present invention wherein:

FIG. 1 is a schematic view with portions thereof in vertical mid cross section illustrating the apparatus and method of waste water treatment in accordance with the teachings of the present invention; and FIG. 2 is an enlarged view in vertical cross section of the perforated aeration pipe shown in the system of FIG. 1 as seen along section line II—II.

DETAILED DESCRIPTION OF A PREFERRED EMBODIMENT

Referring to FIGS. 1 and 2, the apparatus 10 of the present invention is illustrated for treating waste water.

An inclined aeration pipe 11 is provided for passing waste water therethrough from left to right as seen in FIG. 1 by gravity flow. Pipe 11 is provided with tuyere perforations 12 in a series of horizontal rows which are stacked vertically in the lower left hand quadrant of aeration pipe 11 as viewed in FIG. 2. Tuyere perforations 12 penetrate pipe 11 with the same orientation which is other than at right angles to the wall of pipe 11 for encouraging circular agitation of waste water 13 as illustrated by the curved arrows 14 in FIG. 2.

These tuyere perforations 12 extend upwardly from the bottom of pipe 11 with successively decreasing hole diameter wherein the bottom row 15 of tuyere perforations are larger in diameter than the diameters of the tuyere perforations in row 16, which in turn are larger in diameter than the tuyere perforations in row 17. For example, tuyere perforations 15 might be 1 inch in diameter, perforations 16 ¾ inch in diameter, and perforations of row 17 ½ inch in diameter.

A sealed jacket 18 surrounds the perforated portion of aeration pipe 11 and is air tight with the exception of upwardly extending access conduit 20 which extends upwardly above the ground surface 21 and is connected to jacket 18 for access to the interior thereof. Access conduit 20 is provided with an open inlet 22. An electric air fan 23 is mounted in the upper end of access conduit 20 for forcing air under pressure from inlet 22 down into the interior of jacket 18 and through perforations 12 as tuyeres for aerating waste water passing by gravity flow through pipe 11

The electric fan 23 in this instance is a relatively inexpensive fan of approximately 10 horsepower capacity with the capability of supplying an air flow of approximately 3,000 cfm and an internal pressure within the interior of jacket 18 of 12 inches. This is more than adequate to prevent the gravity flowing waste water 13 in aeration pipe 11 from exiting the tuyere perforations 12 and to further adequately agitate and foam this flowing waste water through injection of compressed air into the waste water 13 through tuyere perforations 12.

Additional aeration of the aerated and foam waste water exiting the downstream end of aeration pipe 11 may be carried out by an aerator indicated generally at 30. Aerator 30 is comprised of a vertical riser pipe 31 of predetermined height for flowing foamed waste water by gravity flow upwardly from its upper open end 32.

A circular splash baffle 33 is provided adjacent the outside of upper open end 32 to provide additional aeration of the fountain head of foamed waste water exiting the upper end 32 of riser pipe 31.

Riser pipe 31 is provided with a serpentine form as illustrated in the FIG. 1 for providing a circulative flow path for the foamed waste water rising upward through the riser pipe 31. This provides additional aeration and agitation.

A vent hole 34 is provided in the riser pipe 31 intermediate its upper and lower ends. Generally vent hole 34 might be provided a level of approximately 12" above the center of the underlying unperforated pipe extension 11 which feeds the bottom end of riser pipe 31.

Riser pipe 31 is enclosed in a pit housing 35 having a bottom wall and a removable perforated lid 36 for providing access to the pit and for further permitting access or ingress of air into the pit for aeration. A flush valve 36 is provided at the bottom end of riser pipe 31 in the form of a flap valve that is operable from above the lid 36 by means of handle 37 and its connecting rod 38 This valve 36 is provided for selectively flushing accumulated solid waste matter such as stones in the lower end portion of riser pipe 31 into the interior of housing 35 for ultimate removal or flushing down drain pipe 40 of housing 35.

I claim:

1. Apparatus for treating waste water comprising: an inclined pipe for passing waste water therethrough by gravity flow, said pipe having tuyere perforations penetrating said pipe along a portion thereof, a sealed jacket surrounding said perforated portion of said pipe, an access conduit connected to said jacket for access to the interior thereof and having an open inlet positioned above said jacket, and an air fan connected to said access conduit for forcing air under pressure from said inlet through said perforations as tuyeres for aerating waste water passing through said pipe.

2. The apparatus of claim 1 wherein said tuyere perforations are provided in a bottom half segment of said pipe.

3. The apparatus of claim 2 wherein said pipe has a round wall cross section and said tuyere perforations are provided in a bottom quadrant segment of said pipe.

4. The apparatus of claim 2 wherein said tuyere perforations extend in horizontal rows stacked upwardly from the bottom of said pipe with successively decreasing hole diameter.

5. The apparatus of claim 3 wherein said tuyere perforations penetrate said pipe with the same orientation which is other than at right angles to the wall of said pipe for encouraging circular agitation of waste water flowing through said pipe.

6. The apparatus of claim 1 including an aerator connected to a downstream end of said pipe and comprising a vertical riser pipe of predetermined vertical height for flowing waste water by gravity flow from an upper open end of said riser pipe.

7. The apparatus of claim 6, said riser pipe having a horizontal splash baffle positioned adjacent and outside of said upper open end.

8. The apparatus of claim 6 wherein said riser pipe is serpentine for providing a circulative flow path.

9. The apparatus of claim 6 including a vent hole in said riser pipe intermediate upper and lower ends thereof.

10. The apparatus of claim 6 including a housing enclosing said riser pipe and having a bottom outlet drain, and further including a flush valve at a lower end portion of said riser pipe for selectively flushing accumulated solid waste in said lower end portion of said riser pipe into said housing.

* * * * *